Figure 1:
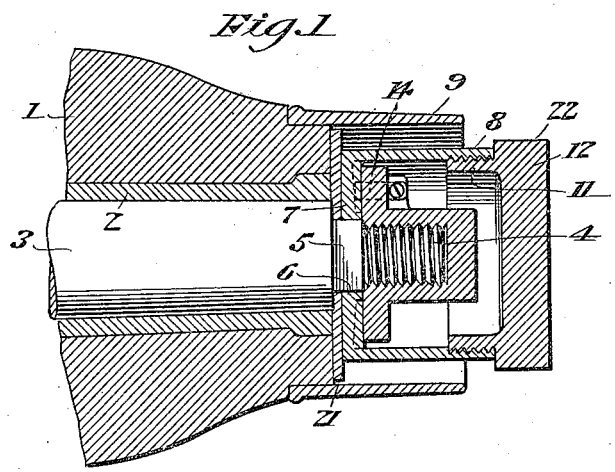

J. CHAREST.
VEHICLE ATTACHMENT.
APPLICATION FILED JULY 17, 1917.

1,274,990.

Patented Aug. 6, 1918.
2 SHEETS—SHEET 1.

WITNESSES

INVENTOR
Joseph Charest
BY Victor J. Evans
ATTORNEY

J. CHAREST.
VEHICLE ATTACHMENT.
APPLICATION FILED JULY 17, 1917.
1,274,990.
Patented Aug. 6, 1918.
2 SHEETS—SHEET 2.
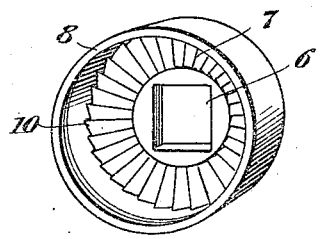
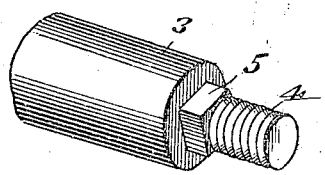
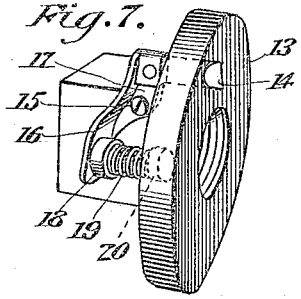
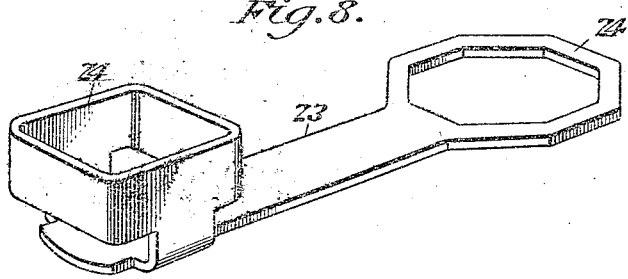
WITNESSES
INVENTOR
Joseph Charest
BY Victor J. Evans
ATTORNEY

UNITED STATES PATENT OFFICE.

JOSEPH CHAREST, OF SAN FRANCISCO, CALIFORNIA.

VEHICLE ATTACHMENT.

1,274,990.  Specification of Letters Patent.  Patented Aug. 6, 1918.

Application filed July 17, 1917. Serial No. 181,122.

*To all whom it may concern:*

Be it known that I, JOSEPH CHAREST, a citizen of the United States, residing at San Francisco, in the county of San Francisco and State of California, have invented new and useful Improvements in Vehicle Attachments, of which the following is a specification.

The present invention relates to a device designed to be applied upon the outer end of a vehicle hub, to engage with the spindle of the axle designed to inclose a carriage or axle nut and to coöperate therewith for effectively retaining the said nut in locked position upon the threaded end of the spindle.

It is a further object of the invention to produce a device of this character including a cylindrical member having a closed end provided with a squared opening to receive a squared projection upon the axle spindle, the inner face of the closed end of the said cylindrical member being formed with ratchet teeth, a nut being screwed upon the threaded end of the spindle and having spring pressed means for co-engaging with the said ratchet teeth, while a cap nut is provided for the end of a cylindrical member whereby to protect the nut and the locking means therefor from dust, oil, etc.

It is a further object of the invention to provide a means for locking a carriage nut upon an axle spindle in which all the parts will be protected from outside contact and in which the nut may be readily screwed upon the threaded end of the spindle and easily removed therefrom when desired.

With the above and other objects in view the improvement resides in the construction, combination and arrangement of parts set forth in the following specification and falling within the scope of the appended claims.

Figure 2:
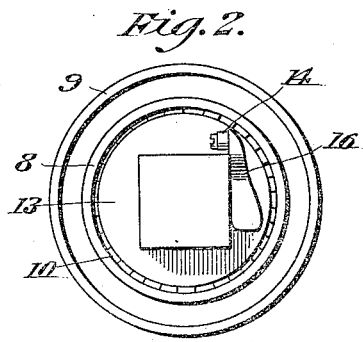
Figure 4:
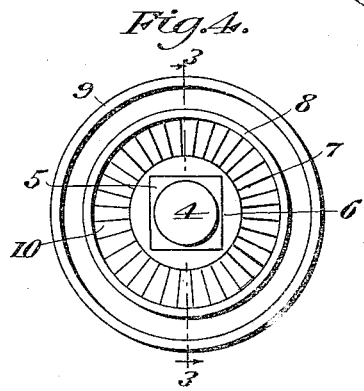
Figure 3:
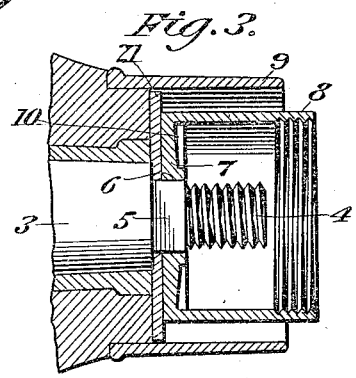

In the drawings:

Figure 1 is an approximately central longitudinal sectional view through a vehicle hub illustrating the application of the improvement, Fig. 2 is an end view, the cap for the sleeve member being removed, Fig. 3 is a sectional view approximately on the line 3—3 of Fig. 4, Fig. 4 is an end view with the carriage nut removed, Fig. 5 is a perspective view of the sleeve member looking toward the inner face thereof, Fig. 6 is a detail perspective view of the end of the axle spindle, Fig. 7 is a similar view of the carriage nut, and

Fig. 8 is a view of a wrench which may be employed.

My improvement is adapted to be applied to spindles of any ordinary vehicle axle and to co-engage with the end of the axle hub, as will presently be apparent.

Referring now to the drawings in detail, the numeral 1 designates an ordinary vehicle hub, 2 the boxing therein, 3 the axle spindle and 4 the threaded end of the spindle.

Between the reduced threaded extension 4 and the spindle proper, the said spindle is provided with a squared or rectangular projection 5 designed to receive the squared or rectangular opening 6 in the closed end 7 of a cylindrical member 8. The cylindrical member is designed to be received in the nose band 9 at the outer end of the hub 1 and to contact with the outer end of the said hub as well as with the outer ends of the spindle 3 and the boxing 2. The outer face of the closed end 7 of the cylindrical member 8 is smooth, but the inner face thereof is provided with teeth 10 radiating from the center of said member. The cylindrical member or sleeve 8, at the outer end thereof, is provided with internal threads whereby to engage with external threads provided upon the inner flanged member 11 of a cap nut 12, the said cap nut 12 forming the outer closure for the sleeve. The nut for the threaded end 4 of the spindle is of the ordinary construction and is commonly known as a carriage nut, the same having its inner end provided with a circular flange, and this flange of the carriage nut 13, adjacent the edge or periphery of the said flange and in a line with one of the sides of the nut proper is provided with an aperture through which is passed a dog 14. To the side of the nut in a line with the aperture receiving the dog 14 is pivotally secured, as at 15, a dog operating member in the nature of an angular arm 16. The arm, at the side thereof, provided with the pivot 15, is formed with a flange 17 through which the said pivot passes, and the underface of the arm is preferably provided with a socket member 18, the said socket receiving one of the ends of a helical spring 19, the opposite end being received in a suitable depression 20 in the flange of the nut 13. The spring 19 is designed to normally swing the dog 14 into engagement with the ratchet teeth 10 upon the inner face of the member 7 of the sleeve 8, so that when the nut is screwed home upon the threaded end 4 of the spindle 3, the said nut will be locked against retrograde movement with respect to the said spindle. The binding of the flange of the nut against the inner face of the sleeve 8 forces the said sleeve into contact with the end of the hub 1, and by the arrangement of the cap 12 upon the sleeve it will be noted that the carriage nut and the locking mechanism carried thereby will be effectively protected from dust, dirt, oil, etc. In this connection it may be stated that a suitable compressible gasket or washer may be arranged between the end 7 of the sleeve and the outer end of the hub 1, the same being indicated by the numeral 21 in the drawings.

The cap member or nut 12 is centrally provided with a squared or octagonal extension upon its outer face, indicated for distinction by the numeral 22, and in the drawings I have illustrated a wrench 23 having one of its ends provided with a flanged socket 24 of a size to engage with the carriage nut and to contact with the angular arm 16 to compress the spring 19 and retract the dog 14 from engagement with the ratchet teeth 10. The opposite end of the wrench 23 is also in the nature of a socket member as indicated by the numeral 24 and this socket member is of a size to engage with the squared or octagonal extension upon the outer face of the cap member 12 whereby to arrange the cap upon the sleeve or to remove the same therefrom.

Having thus described the invention, what I claim is:

1. In combination with a vehicle spindle having a squared portion inward of its threaded extension, of a sleeve having a closed end provided with a squared opening to receive the squared portion of the spindle, the said closed end of the sleeve upon its inner face having inwardly disposed ratchet teeth, a flanged nut for the threaded end of the sleeve, a dog passing through an opening in the flange of the nut and designed to engage with the threads of the teeth of the sleeve, an angularly arranged spring pressed finger pivotally secured to one of the sides of the carriage nut and loosely connected with the dog, and a cap nut threadedly engaging with the open end of the sleeve.

2. In combination with a vehicle spindle having a squared portion inward of its threaded end, of a sleeve having a closed end provided with a square opening received on the square portion of the spindle, said closed end of the sleeve having its inner face provided with radially disposed ratchet teeth, a flange carriage nut screwed on the spindle in the sleeve and contacting with the inner face of the sleeve, a dog in the flange of the nut engaging with the teeth of the sleeve, an arm pivotally secured to the dog and pivotally connected to one of the sides of the nut and having a flanged outer end formed upon its inner face with a socket, a spring received in this socket and in a depression in the flange of the nut, and a cap nut for closing the open end of the sleeve.

In testimony whereof I affix my signature.

JOSEPH CHAREST.

Copies of this patent may be obtained for five cents each, by addressing the "Commissioner of Patents, Washington, D. C."